US010562170B2

(12) United States Patent
Nagasaka et al.

(10) Patent No.: US 10,562,170 B2
(45) Date of Patent: Feb. 18, 2020

(54) RECHARGEABLE ELECTRIC POWER TOOL

(71) Applicant: MAKITA CORPORATION, Anjo-shi, Aichi (JP)

(72) Inventors: Hidenori Nagasaka, Anjo (JP); Tomohiko Imae, Anjo (JP)

(73) Assignee: MAKITA CORPORATION, Anjo (JP)

( * ) Notice: Subject to any disclaimer, the term of this patent is extended or adjusted under 35 U.S.C. 154(b) by 271 days.

(21) Appl. No.: 15/493,541

(22) Filed: Apr. 21, 2017

(65) Prior Publication Data

US 2018/0009098 A1 Jan. 11, 2018

(30) Foreign Application Priority Data

Jul. 5, 2016 (JP) .................................. 2016-133571

(51) Int. Cl.
*B25F 5/00* (2006.01)
*B25F 5/02* (2006.01)

(52) U.S. Cl.
CPC ................. *B25F 5/02* (2013.01); *B25F 5/00* (2013.01); *B25F 5/008* (2013.01); *B25F 5/026* (2013.01); *B25F 5/001* (2013.01)

(58) Field of Classification Search
CPC .. B25F 5/00; B25F 5/001; B25F 5/008; B25F 5/02; H02J 7/00; H02J 7/0045; H02J 7/0063
USPC .......... 173/217, 216, 29, 170; 451/357, 359, 451/344, 453
See application file for complete search history.

(56) References Cited

U.S. PATENT DOCUMENTS

| | | | | |
|---|---|---|---|---|
| 4,136,579 A * | 1/1979 | Robinson | ............. | B25H 1/0057 173/36 |
| 6,102,632 A * | 8/2000 | Potter | ..................... | B25F 5/001 173/217 |
| 6,296,427 B1 * | 10/2001 | Potter | ..................... | B25F 5/001 173/217 |
| 6,876,173 B2 * | 4/2005 | Mastaler | .................. | B25F 5/02 320/114 |
| 7,137,761 B2 * | 11/2006 | Hara | ....................... | B25F 5/021 408/16 |
| 7,768,750 B2 * | 8/2010 | Uchida | .................. | B25F 5/008 320/134 |
| 8,984,711 B2 * | 3/2015 | Ota | ......................... | H01M 2/10 15/339 |
| 9,278,426 B2 * | 3/2016 | Numata | .................. | B24B 55/00 |
| 2003/0102844 A1 * | 6/2003 | Bailey | ....................... | B25F 5/00 320/114 |
| 2006/0119318 A1 * | 6/2006 | Serdynski | ............... | H01M 2/34 320/114 |

(Continued)

FOREIGN PATENT DOCUMENTS

JP 2014-148021 A 8/2014

*Primary Examiner* — Scott A Smith
(74) *Attorney, Agent, or Firm* — Oliff PLC

(57) ABSTRACT

A rechargeable electric power tool includes a motor that includes a rotation shaft, a motor housing that houses the motor, a gear housing disposed ahead of the motor, a final output shaft that is held onto the gear housing and perpendicular to the rotation shaft, and a loop-shaped handle housing disposed at a rear of the motor housing, and a battery mounting portion configured to hold two battery packs is disposed at a rear portion of the handle housing.

10 Claims, 11 Drawing Sheets

(56) References Cited

U.S. PATENT DOCUMENTS

| | | | | |
|---|---|---|---|---|
| 2006/0222930 | A1* | 10/2006 | Aradachi | H01M 2/1055 |
| | | | | 429/96 |
| 2007/0144752 | A1* | 6/2007 | Pozgay | B25B 21/00 |
| | | | | 173/216 |
| 2010/0108337 | A1* | 5/2010 | Norona | B23B 45/008 |
| | | | | 173/1 |
| 2011/0198103 | A1* | 8/2011 | Suzuki | B25F 5/00 |
| | | | | 173/46 |
| 2011/0272172 | A1* | 11/2011 | Lau | B25F 3/00 |
| | | | | 173/170 |
| 2011/0284257 | A1* | 11/2011 | Ogino | B25F 5/00 |
| | | | | 173/217 |
| 2012/0165152 | A1* | 6/2012 | Tokunaga | B23D 47/12 |
| | | | | 475/159 |
| 2015/0328763 | A1* | 11/2015 | Ito | H02J 7/00 |
| | | | | 451/359 |

* cited by examiner

RECHARGEABLE ELECTRIC POWER TOOL

BACKGROUND

This application claims the benefit of Japanese Patent Application Number 2016-133571 filed on Jul. 5, 2016, the entirety of which is incorporated by reference.

TECHNICAL FIELD

The disclosure relates to a rechargeable electric power tool such as an angle drill using a battery pack as a power source.

RELATED ART

As disclosed in Japanese Patent Application Publication No. 2014-148021 (JP-A-2014-148021), there has been known a rechargeable electric power tool that includes a battery pack, as a power source, at a battery mounting portion disposed in a housing. JP-A-2014-148021 exemplifies an angle drill where a motor is disposed in a middle portion of the tubular housing that extends in a front-rear direction, and a spindle having a chuck is downwardly disposed at its front portion, so as to allow rotation of an output shaft of the motor to transmit to the spindle via a deceleration mechanism such as a bevel gear. A battery base (battery mounting portion) is disposed at a rear end of the housing, and two battery packs whose output voltages are 18 V can be mounted on the battery base. Ahead of the battery base, a controller substrate is disposed. Ahead of the controller substrate, a switch is disposed.

The above-described conventional rechargeable electric power tool is heavy in weight because a front portion having the chuck, the spindle, the deceleration mechanism, and similar parts, and a rear portion on which the two battery packs are mounted are combined. Thus, it is difficult to operate the conventional rechargeable electric power tool.

Therefore, it is an object of the present disclosure to provide a rechargeable electric power tool excellent in operability even if its weight is heavy.

SUMMARY

In order to achieve the above-described object, there is provided a rechargeable electric power tool according to an embodiment of the disclosure. The rechargeable electric power tool may include a motor that includes a rotation shaft, a motor housing that houses the motor, a gear housing disposed ahead of the motor, a final output shaft that is held onto the gear housing and perpendicular to the rotation shaft, and a loop-shaped handle housing disposed at a rear of the motor housing. In the rechargeable electric power tool, the handle housing may include a battery mounting portion and a grip portion. The battery mounting portion may extend in a vertical direction and may be configured to hold a battery pack. The grip portion may extend in a front-rear direction, and a switch may be disposed at the grip portion. A controller may be disposed at the handle housing.

In this case, it is preferable that the handle housing includes a controller housing portion that extends in the front-rear direction below the grip portion, and the controller may be disposed at the controller housing portion.

It is preferable that airflow generated by rotation of a fan disposed at the rotation shaft passes through the controller housing portion to cool the controller.

It is preferable that an air intake opening for generating the airflow is formed on a lower surface of the controller housing portion.

Further, in one aspect of the disclosure, the handle housing may include a controller housing portion that is provided ahead of the grip portion and the controller is disposed at the controller housing portion.

In this aspect, it is preferable that airflow generated by rotation of a fan disposed at the rotation shaft passes through the controller housing portion to cool the controller.

Further, it is preferable that the controller is disposed at the controller housing portion in an inclined posture such that a front side is higher than a rear side.

In another aspect of the disclosure, the handle housing may include a controller housing portion that is provided at a rear of the grip portion and the controller is disposed at the controller housing portion.

In this aspect, it is preferable that airflow generated by rotation of a fan disposed at the rotation shaft passes through the controller housing portion to cool the controller.

It is preferable that the controller is disposed at the controller housing portion so as to extend in the vertical direction.

In order to achieve the above-described object, there is provided a rechargeable electric power tool according to another embodiment of the disclosure. The rechargeable electric power tool may include a motor that includes a rotation shaft, a motor housing that houses the motor, a gear housing disposed ahead of the motor, a final output shaft that is held onto the gear housing and perpendicular to the rotation shaft, and a loop-shaped handle housing disposed at a rear of the motor housing. In the rechargeable electric power tool, a battery mounting portion configured to hold two battery packs may be disposed at a rear portion of the handle housing.

In this embodiment, it is preferable that the two battery packs laterally slide in a lateral posture to be mounted on the battery mounting portion, and are held in parallel in a vertical direction.

It is preferable that the battery pack has an output voltage with 36 V in total.

It is preferable that in a state where the battery pack is held onto the battery mounting portion, a whole gravity center position is in a range from a front side of a loop-shaped part at the handle housing to the motor housing.

It is preferable that a grid-like reinforcing rib is disposed upright on an inner surface of the handle housing.

It is preferable that the motor is a brushless motor.

In this disclosure, the terms "perpendicular to" in the phrase "the final output shaft that is perpendicular to the rotation shaft" means that it allows a slight error including strict perpendicularity.

According to this disclosure, the gear housing and the battery pack, which are heavy in weight, are disposed back and forth to be well-balanced. Further, because the handle housing is in a loop shape, a stable grip can be obtained. Accordingly, even if the weight is heavy, operability is excellent.

DETAILED DESCRIPTION

The following describes an embodiment of this disclosure based on the drawings.

Figure 1:
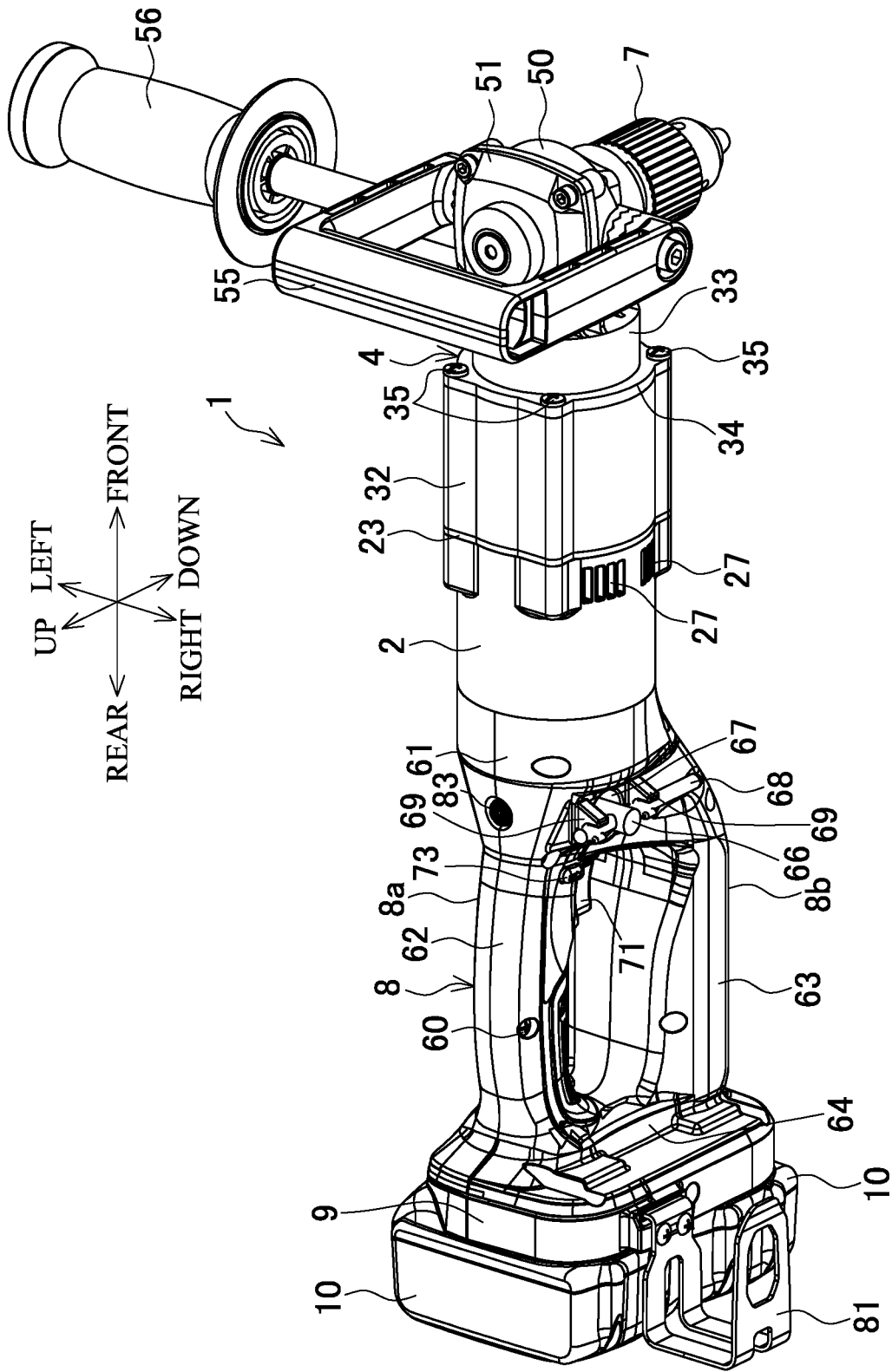
FIG. 1 is a perspective view of a rechargeable angle drill.
Figure 2:
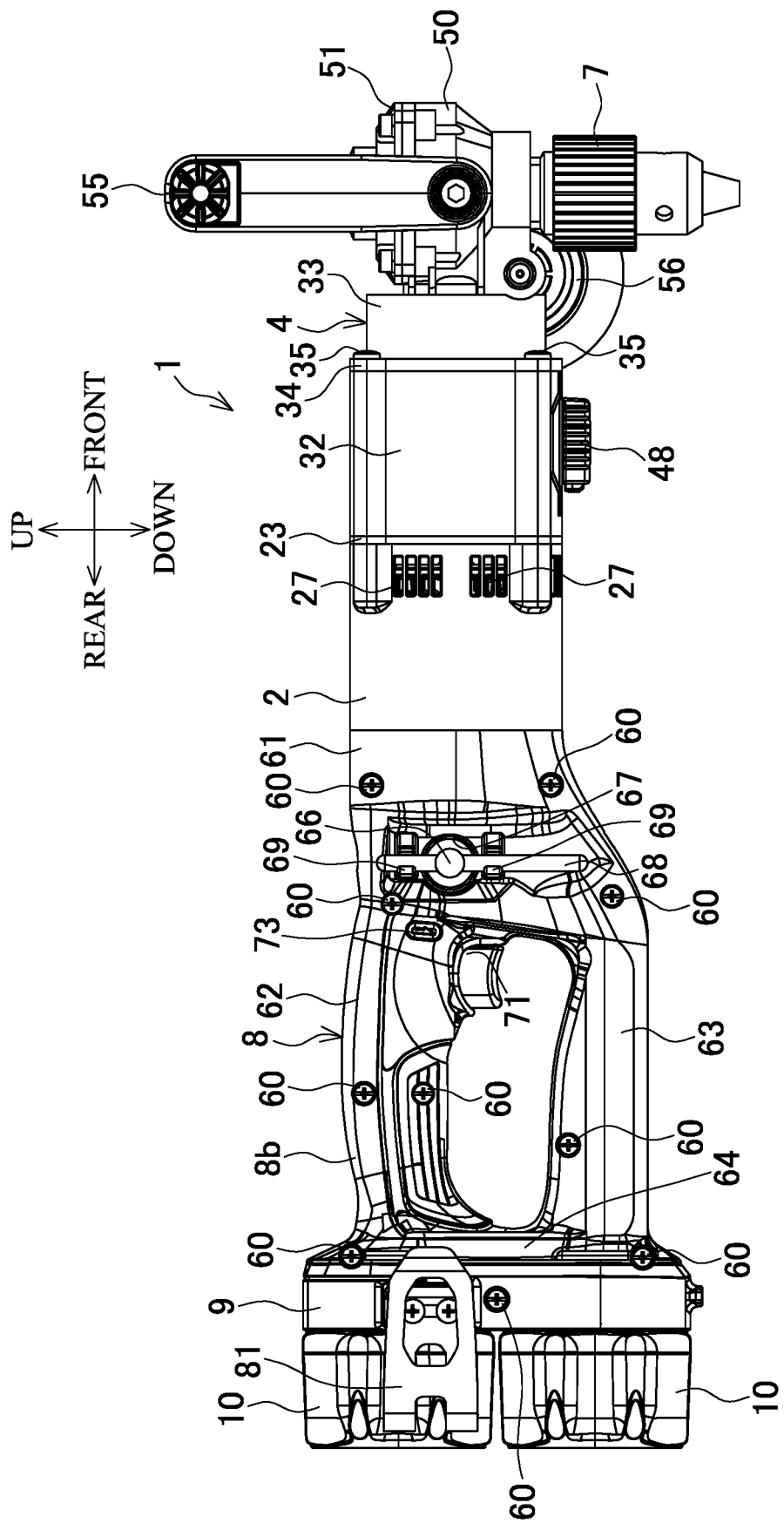
FIG. 2 is a right side view of the rechargeable angle drill.
Figure 3:
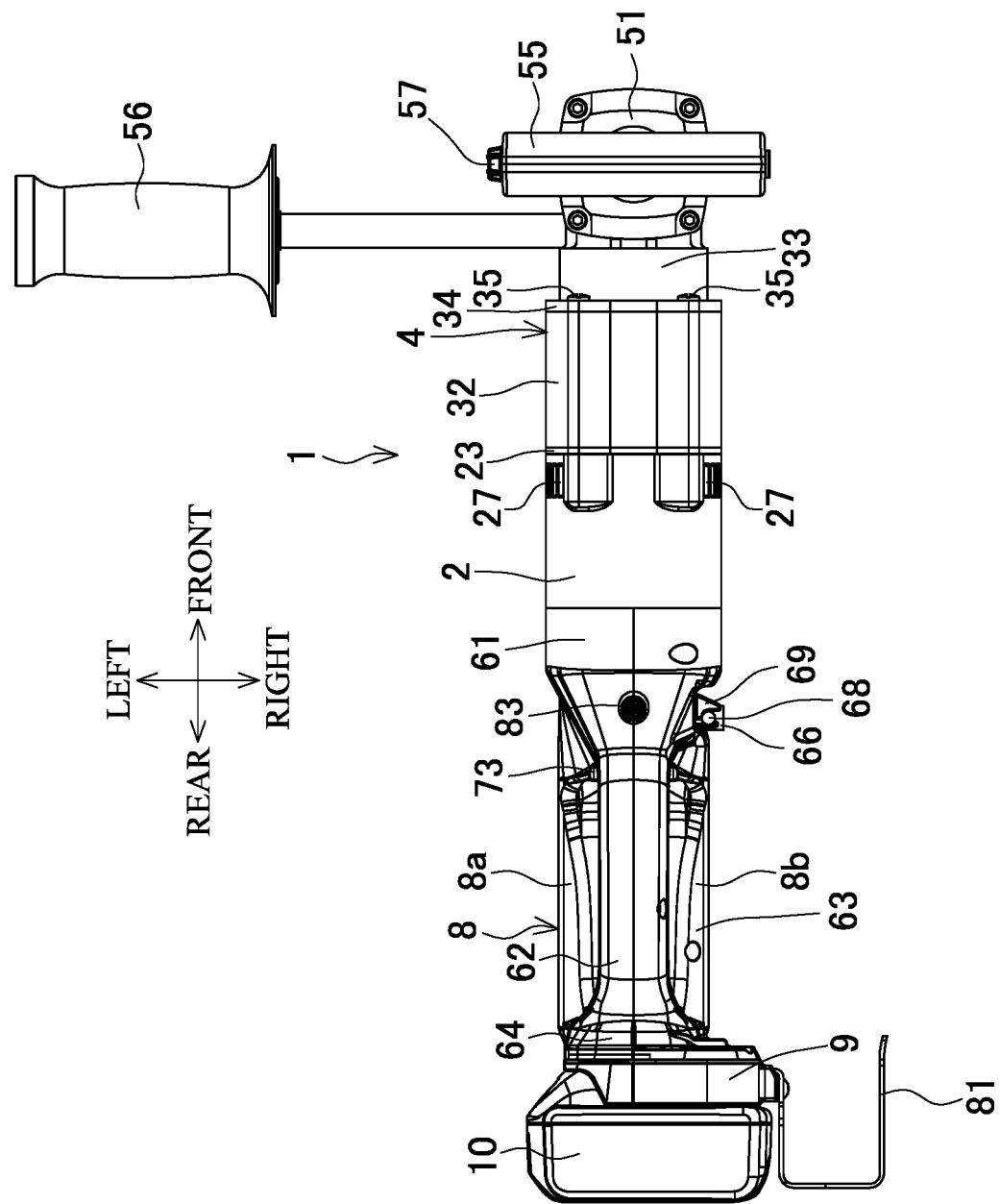
FIG. 3 is a plan view of the rechargeable angle drill.
Figure 4:
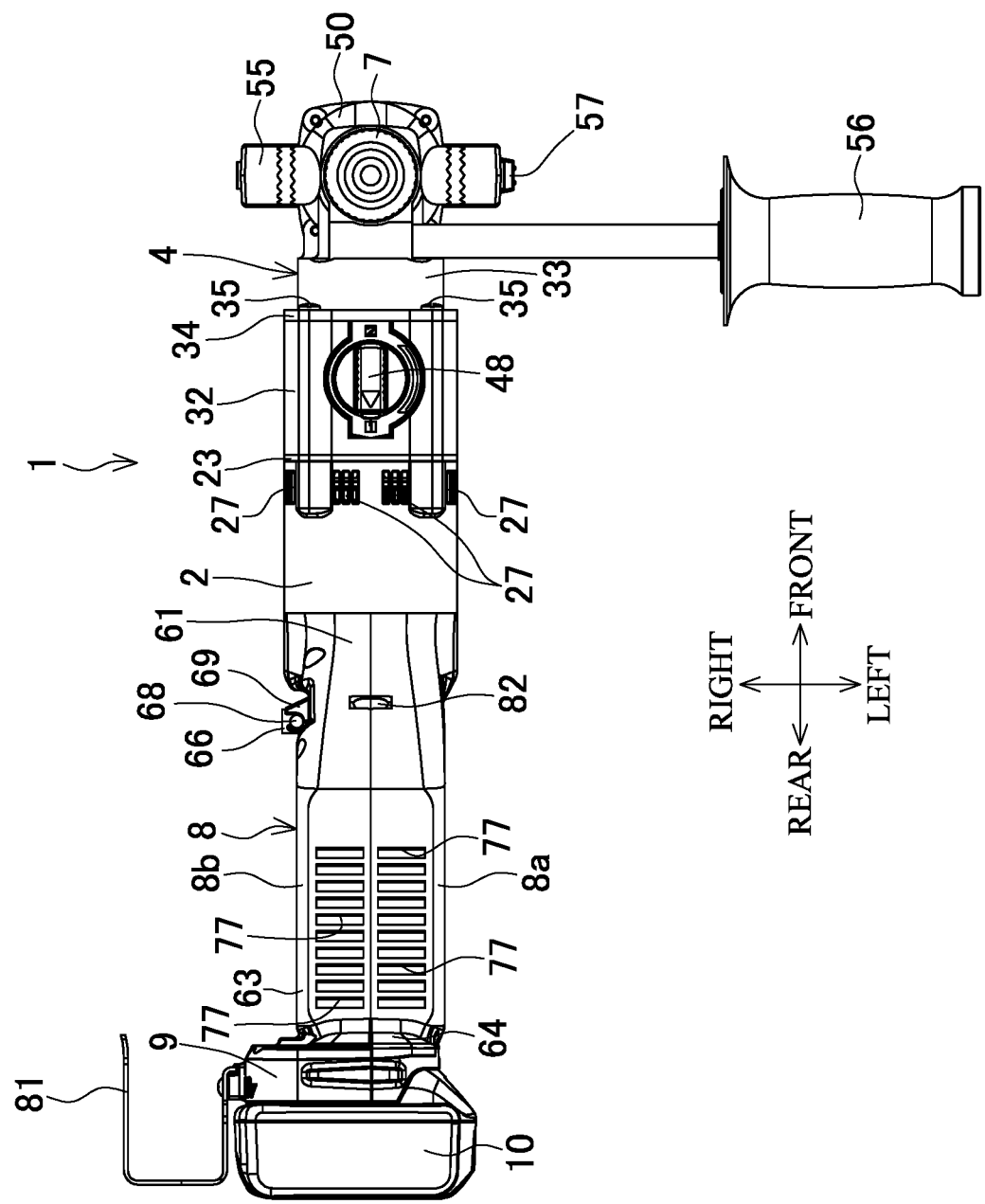
FIG. 4 is a bottom view of the rechargeable angle drill.
Figure 5:
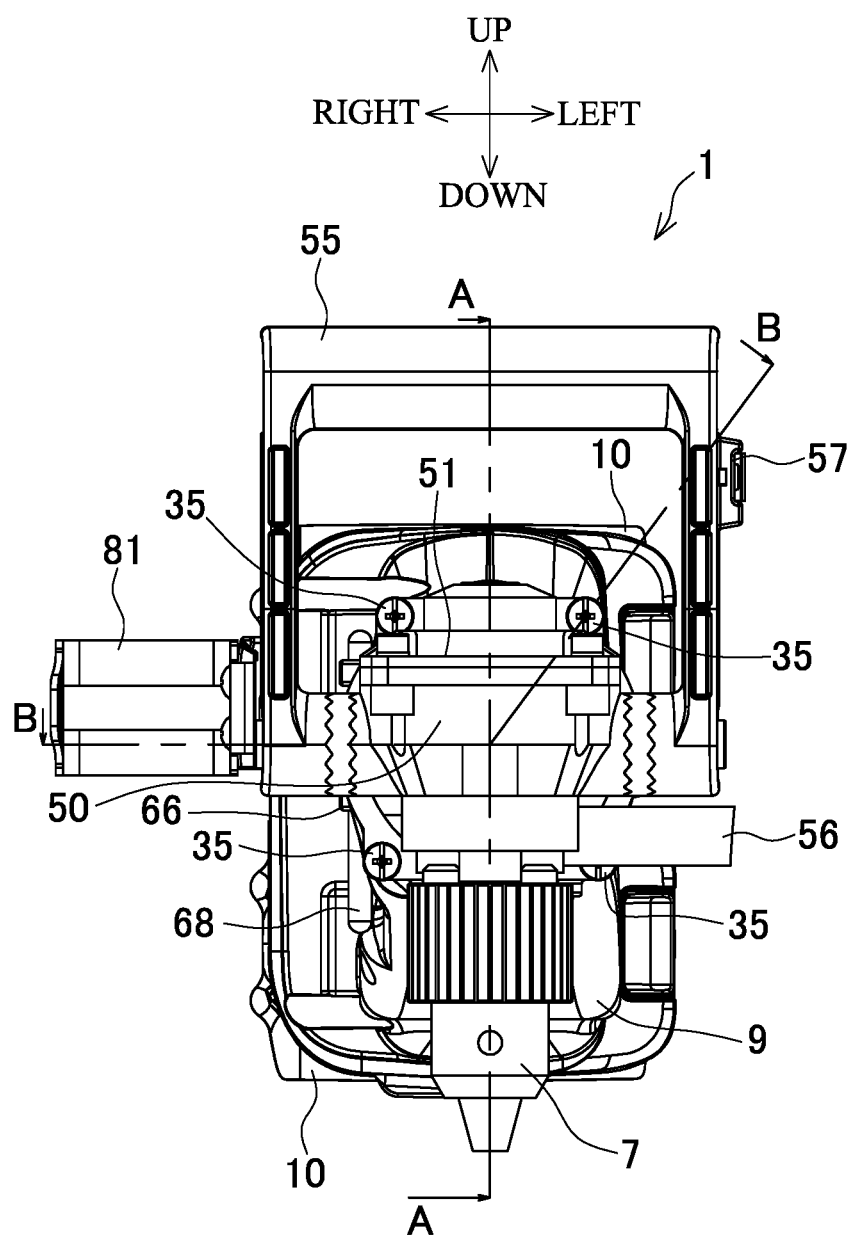
FIG. 5 is a front view of the rechargeable angle drill.
Figure 6:
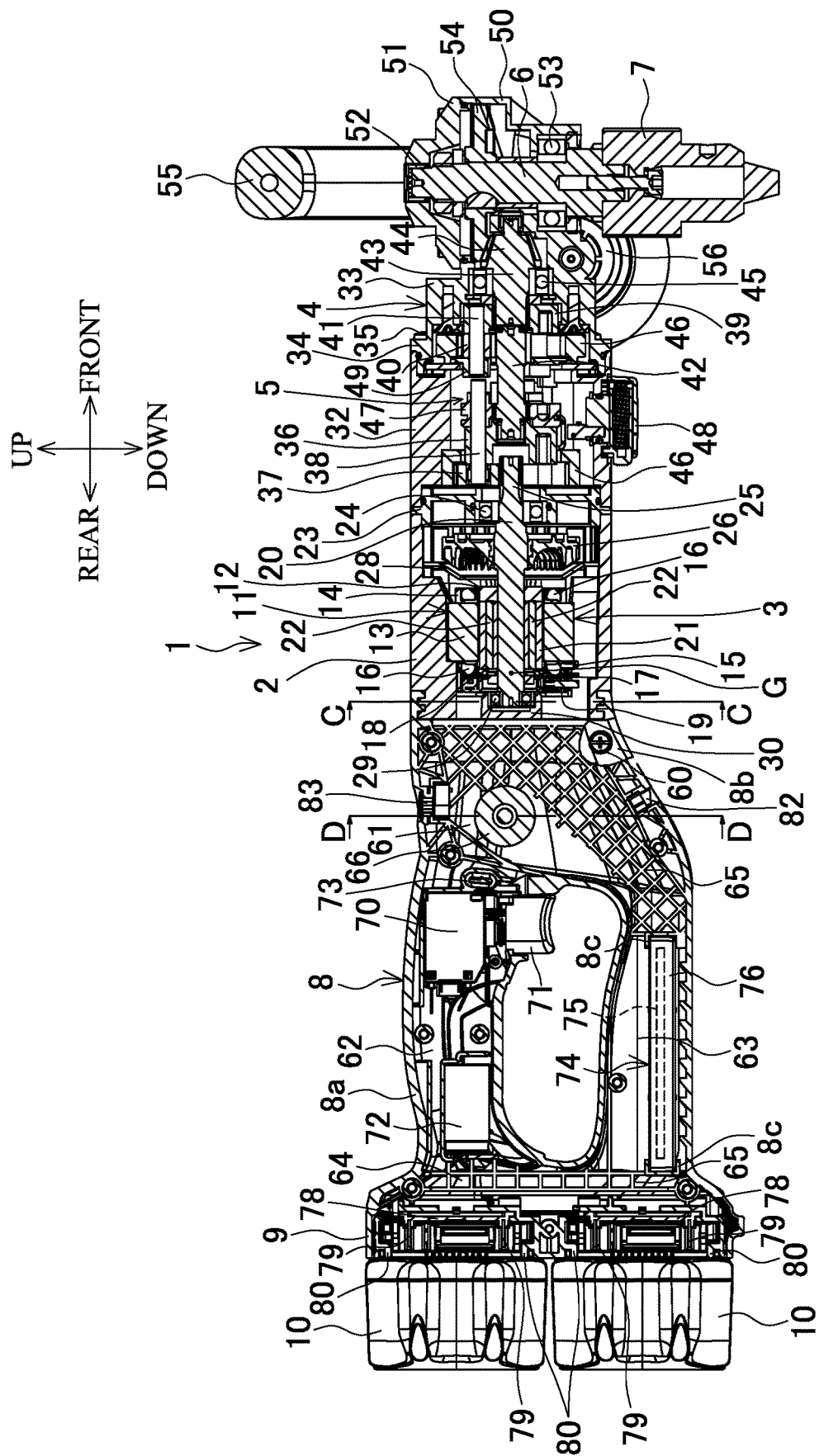
FIG. 6 is a cross-sectional view taken along the line A-A in FIG. 5.
Figure 7:
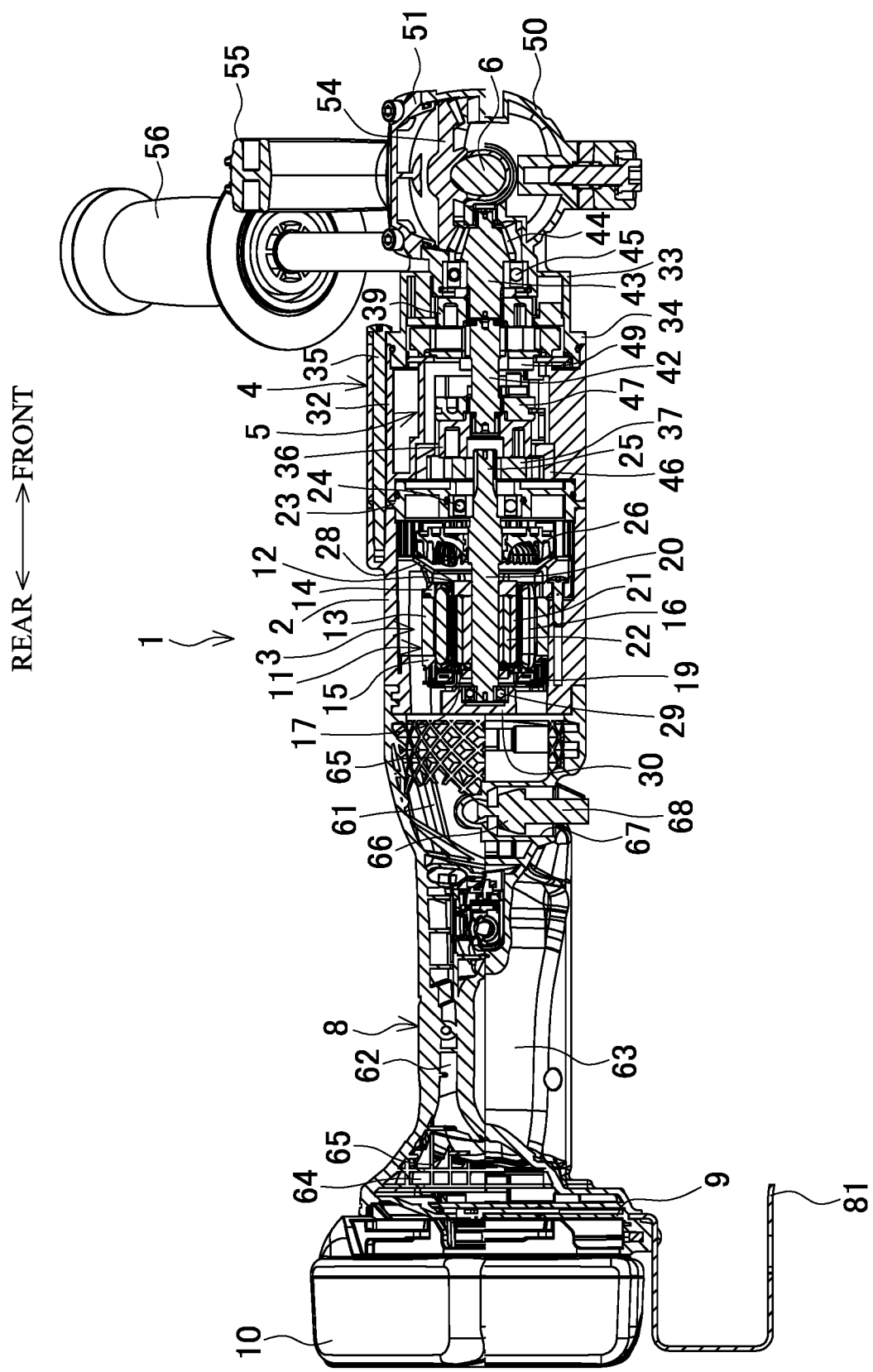
FIG. 7 is a cross-sectional view taken along the line B-B in FIG. 5.

FIG. 1 is a perspective view of a rechargeable angle drill, which is an exemplary rechargeable electric power tool, FIG. 2 is its right side view, FIG. 3 is its plan view, FIG. 4 is its bottom view, and FIG. 5 is its front view. FIG. 6 is vertical cross-sectional view taken along the line A-A. FIG. 7 is a cross-sectional view taken along the line B-B.

In the rechargeable angle drill (hereinafter referred to as simply an "angle drill") 1 shown in FIGS. 1 to 7, a front of a motor housing 2 is coaxially coupled to a gear housing 4. The gear housing 4 is made of metal (e.g. Aluminum) and houses a deceleration mechanism 5, and the motor housing 2 is made of resin and houses a brushless motor 3. In a front portion of the gear housing 4, a spindle 6 is downwardly housed. The spindle 6, as a final output shaft, mounts a drill chuck 7 on its lower end. On the other hand, a rear of the motor housing 2 is coupled to a handle housing 8 which is made of resin and has a loop shape that is long back and forth in a side view. At a rear end of the handle housing 8, a battery mounting portion 9 is formed to be configured to attach and remove upper and lower two battery packs 10, 10.

The brushless motor 3 is an inner rotor type motor including a tubular stator 11 and a rotor 12 inside the stator 11. First, the stator 11 includes a stator core 13, a front insulating member 14 and a rear insulating member 15, a plurality of coils 16, 16, . . . , and a sensor circuit board 17. The stator core 13 is made such that a plurality of steel plates are laminated. The front insulating member 14 and the rear insulating member 15 are disposed at a front and a rear of the stator core 13. The coils 16, 16 . . . are wound around the stator core 13 via the front insulating member 14 and the rear insulating member 15. The sensor circuit board 17 is mounted on the rear insulating member 15, and rotation detecting elements 18, 18, . . . are mounted on a front surface of the sensor circuit board 17. A short-circuit member 19 short-circuits and couples fusing terminals with each other. The fusing terminals are held onto the rear insulating member 15 and are fused to a wire between the coils 16, 16.

Figure 8:
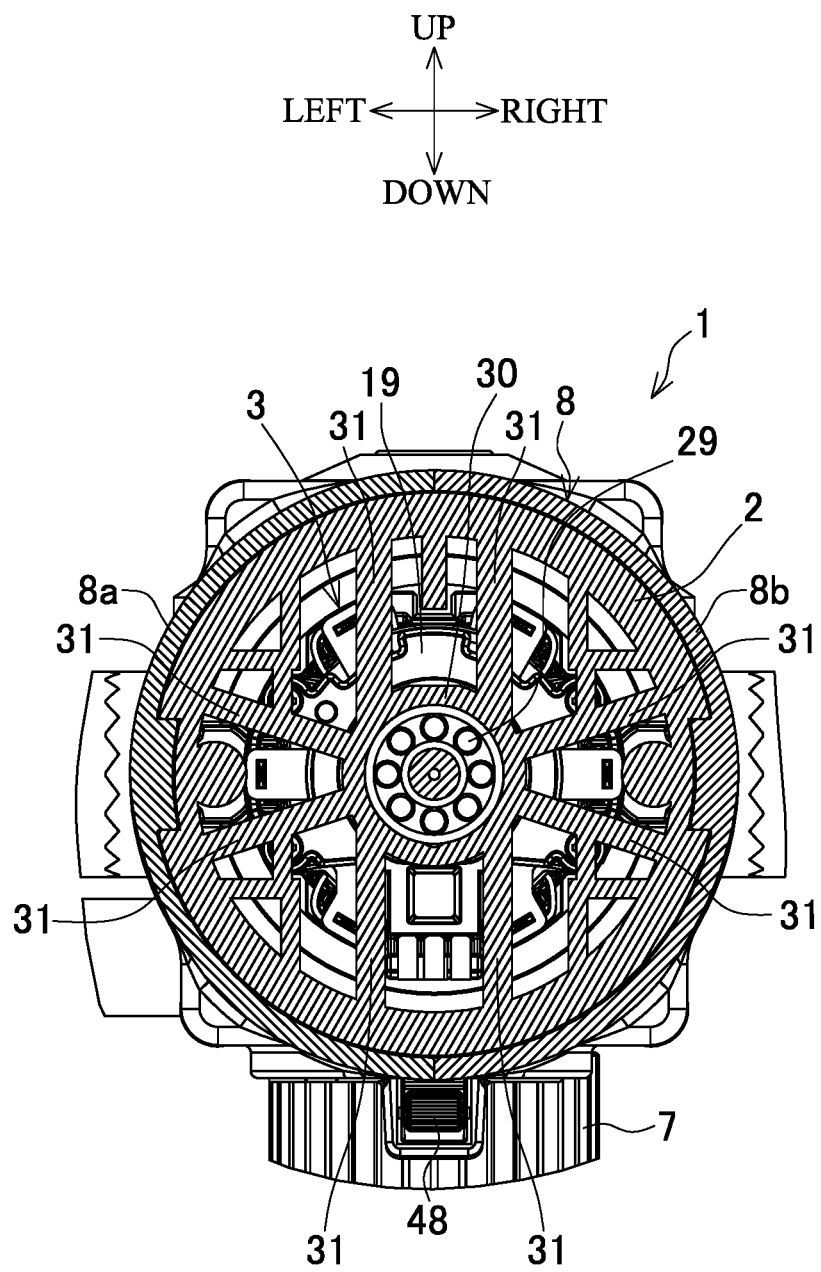
FIG. 8 is an enlarged cross-sectional view taken along the line C-C in FIG. 6.

The rotor 12 includes a rotation shaft 20 that is positioned at a shaft center, a tubular rotor core 21 that is disposed around the rotation shaft 20, and permanent magnets 22, 22, . . . that are held inside the rotor core 21. A front portion of the rotation shaft 20 is supported by a bearing 24 of a motor bracket 23 held between the motor housing 2 and the gear housing 4 and projects inside the gear housing 4. A pinion 25 is formed at a front end of the front portion of the rotation shaft 20. On the rotation shaft 20, a centrifugal fan 26 is mounted at a rear of the bearing 24. A plurality of exhaust outlets 27, 27, . . . are formed on right and left side surfaces and a lower surface of the motor housing 2, at an outer peripheral side of the centrifugal fan 26. A baffle plate 28 is provided to lead airflow from a center to an outer periphery, at a rear of the centrifugal fan 26. A rear end of the rotation shaft 20 is supported by a bearing 29 held onto a rear portion of the motor housing 2. As illustrated in FIG. 8, the bearing 29 is held inside a receiving portion 30 supported at a center by a plurality of support ribs 31, 31, . . . , which extends in vertical and radial directions from an inner periphery of the motor housing 2.

The gear housing 4 is divided in two, a rear tube portion 32 and a front tube portion 33. The gear housing 4 is integrated with the motor housing 2 with four screws 35, 35, . . . which pass through a flange 34 disposed at a rear end outer periphery of the front tube portion 33, the rear tube portion 32, and the motor bracket 23 from the front.

The deceleration mechanism 5 includes a rear side carrier 36 that supports each of a plurality of planetary gears 37, 37 via a support pin 38, and a front side carrier 39 that supports each of a plurality of planetary gears 40, 40 via a support pin 41. The rear side carrier 36 and the front side carrier 39 are axially arranged. The rear side carrier 36 is disposed inside the rear tube portion 32 to engage the planetary gears 37, 37 in a first stage with the pinion 25 of the rotation shaft 20. The front side carrier 39 is disposed inside the front tube portion 33 to engage the planetary gears 40, 40 in a second stage with an intermediate shaft 42 that is coupled to the center of the rear side carrier 36 in an axial direction. Inside the front tube portion 33, an output shaft 43, which integrally rotates with the front side carrier 39 and has a bevel gear 44 at a front end, is supported by a bearing 45 coaxially with the intermediate shaft 42. With internal gears 46, 46, the planetary gears 37, 40 in the respective stages perform planetary movement.

Here, the support pin 38 of the planetary gear 37 in the first stage passes through the rear side carrier 36 and projects forward. A ring-shaped switching member 47 is disposed at the support pin 38 such that the switching member 47 slides back and forth between a retreated position and an advance position. The retreated position is a position where the switching member 47 is engaged with the rear side carrier 36 and the intermediate shaft 42 to integrally rotate, and the advance position is a position where the switching member 47 separates from both of them. Front and rear positions of the switching member 47 are switchable by rotating operation of a speed switching lever 48 disposed on a lower surface of the rear tube portion 32. On the other hand, the support pin 41 of the planetary gear 40 in the second stage passes through the planetary gear 40 and projects rearward. At a rear end of the support pin 41, an engaging member 49 is disposed so as to engage with the switching member 47 at the advance position in a rotation direction.

Accordingly, at the retreated position of the switching member 47, the rotation of the rear side carrier 36 decelerated at the planetary gear 37 in the first stage is transmitted to the planetary gear 40 via the intermediate shaft 42 so as to cause the planetary gear 40 to perform the planetary movement, and then the front side carrier 39 deceleratingly rotates. Therefore, the output shaft 43 is decelerated in the two stages to rotate at low speed.

On the other hand, at the advance position of the switching member 47, the rotation of the rear side carrier 36 decelerated at the planetary gear 37 in the first stage is transmitted to the engaging member 49 via the support pin 38 and the switching member 47 so as to directly rotate the front side carrier 39 via the support pin 41. Accordingly, the deceleration in the second stage of the output shaft 43 is canceled to rotate the output shaft 43 at high speed.

A receiving tube 50, which opens in the vertical direction, is formed at the front tube portion 33, ahead of the output shaft 43. The spindle 6 is housed in the receiving tube 50 on an axis line of the output shaft 43. The spindle 6 is rotatably supported by a bearing 52 (a needle bearing) disposed at a cap 51 that closes an upper side of the receiving tube 50, and a bearing 53 disposed at a lower end of the receiving tube 50. Above the output shaft 43, a bevel gear 54 whose diameter and the number of teeth are larger than those of the bevel gear 44 of the output shaft 43 is integrally coupled to the spindle 6 and is engaged with the bevel gear 44.

A front grip 55 is an inverted U-shaped front grip whose both ends are coupled to right and left side surfaces of the receiving tube 50 by bolts. A side grip 56 is coupled to the front tube portion 33 in a screwing-in state by selecting screw holes disposed on right and left side surfaces of the front tube portion 33 at a rear of the front grip 55. A bit holder 57 is disposed on a left side surface of the front grip 55.

On the other hand, the handle housing 8 includes a tubular portion 61, a grip portion 62 and a controller housing portion 63, and a rear end portion 64. The tubular portion 61 is formed such that right and left half housings 8a, 8b are assembled by screws 60, 60, . . . provided in a right-left direction so as to be coupled to a rear end of the motor housing 2. The grip portion 62 and a controller housing portion 63 branch off in the vertical direction from the tubular portion 61 to the rearward and each have a tube shape. The rear end portion 64 is a portion at which the grip portion 62 is coupled to the controller housing portion 63 again. The battery mounting portion 9 is integrally formed at a rear portion of the rear end portion 64. At inner peripheries of both half housings 8a, 8b, on portions that contact the tubular portion 61, the controller housing portion 63, and the rear end portion 64, a grid-like reinforcing rib 65 is disposed upright.

Figure 9:
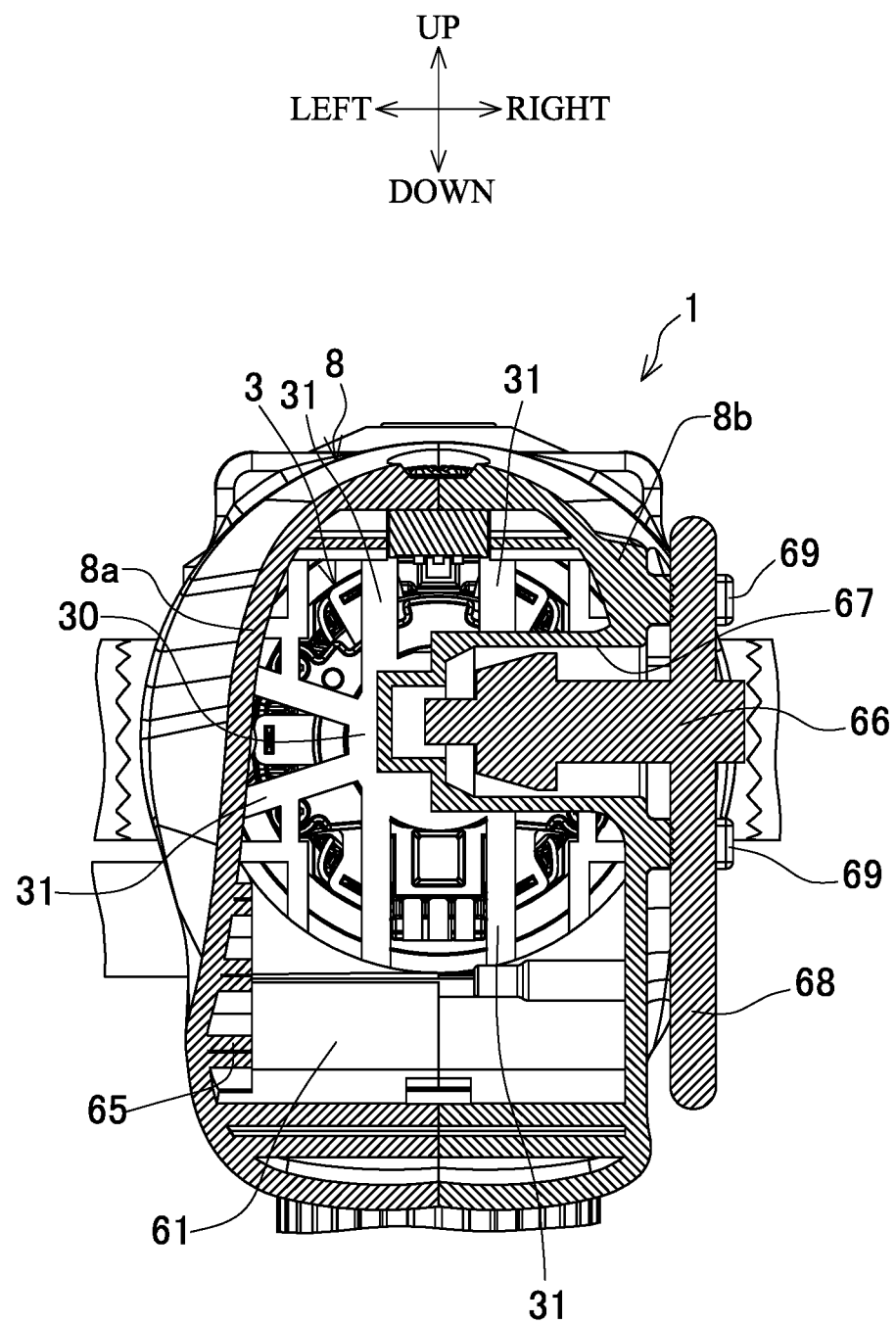
FIG. 9 is an enlarged cross-sectional view taken along the line D-D in FIG. 6.

As illustrated in FIG. 9, on a right side surface of the tubular portion 61, a bottomed housing portion 67 is depressed toward a center side, and a chuck key 66 is inserted to be housed in the housing portion 67. The chuck key 66 performs clamping/unclamping operation of the drill chuck 7. Above and below the housing portion 67 and on a right side surface of the handle housing 8, a pair of claw portions 69, 69 for elastically gripping a lever 68 disposed at the chuck key 66 are each protrudingly disposed.

The grip portion 62 has a tubular shape whose lateral cross-sectional surface is an approximately circular shape. In a front side of the grip portion 62, a switch 70 from which a trigger 71 downwardly projects is housed. In a rear side of the grip portion 62, a capacitor 72 is housed. A forward-reverse switching lever 73 is a forward-reverse switching lever of the brushless motor 3.

The controller housing portion 63 has a tubular shape whose lateral cross-sectional surface is an approximate square, and has a right and left width formed wider than that of the grip portion 62, so as to house a controller 74. The controller 74 is configured such that a control circuit board 75, which has a rectangular shape in a plan view, is housed in a dish-shaped case 76 having a shape identical to that of the control circuit board 75. On the control circuit board 75, a microcomputer, a switching element, and similar parts for driving the brushless motor 3 are mounted. The controller 74 is provided in a lateral posture where its longitudinal direction is laid along the front-rear direction, such that both front and rear ends of the case 76 are held onto holding ribs 8c, 8c disposed to protrude on an inner surface of the handle housing 8.

On a flat lower surface of the controller housing portion 63, a plurality of air intake openings 77, 77, . . . are formed. Each air intake opening 77 is formed so as to open obliquely upward and is configured such that an inside (the controller 74) is not exposed from directly below as illustrated in FIG. 4.

An LED 82 is disposed on an inclined lower surface of the tubular portion 61, ahead of the controller 74. The LED 82 is coupled to the controller 74 via a lead wire (not illustrated) and lights by turning on the switch 70 with the trigger 71, thus irradiating a forward and oblique lower side, which is below the drill chuck 7. As described above, the LED 82 is disposed on the inclined lower surface of the tubular portion 61 that leads to the controller housing portion 63 at a lower side. Therefore, a work position can be preferably irradiated. The LED 82 is disposed at a position depressed upward from a lower surface of the controller housing portion 63 that projects downwardly. Therefore, the possibility of damage can be reduced.

Then, the controller 74 has a well-known configuration that includes a gate driving circuit, which drives a switching element, and a pulse-width modulation (PWM) signal generating unit, which generates a PWM signal corresponding to a manipulated variable of the trigger 71, and the gate driving circuit performs a PWM control for the switching element corresponding to the PWM signal from the PWM signal generating unit. The controller 74 further includes an electric gear function that controls a current conduction angle of a square wave that drives the brushless motor 3 corresponding to a load to the spindle 6 so as to change a rotation velocity.

First, a current detection circuit for detecting a motor current, which is a load index, is disposed. The controller 74 includes a current-conduction-angle determining unit, which determines the current conduction angle based on a detected value by the current detection circuit, and a storage unit, which stores a threshold value and similar value of the motor current.

The current-conduction-angle determining unit compares the detected value of the motor current with the threshold value preliminarily set at the storage unit (for example, 40 A). Then, if the detected value is smaller than this threshold value, the current-conduction-angle determining unit determines the current conduction angle to, for example, 150°. If the detected value is larger than this threshold value, the current-conduction-angle determining unit determines the current conduction angle to, for example, 120°. The gate driving circuit performs an ON/OFF control for the switching element in accordance with the current conduction angle determined by the current-conduction-angle determining unit and drives the brushless motor 3 with square wave. Accordingly, when the load is small, the number of rotations of the brushless motor 3 increases (for example, 30000 rotations) by a large current conduction angle, and a torque decreases. Conversely, when the load is large, the number of rotations decreases (for example, 25000 rotations) by a small current conduction angle, and the torque increases.

At the above-described deceleration mechanism 5 including a mechanical shifting, the rotation of the spindle 6 can be switched at high and low two stages (for example, 1500 rotations at high speed and 400 rotations at low speed) by operation of the speed switching lever 48. In addition, the number of rotations of the brushless motor 3 is automatically switched to the high and low two stages corresponding to the load by employing the electric gear function. Therefore, the velocity is substantially switched to four stages as in following Table 1. Accordingly, a detailed response according to the work can be performed. Table 1 indicates a work torque at each stage together. A lock torque is a maximum torque when the load is excessive, and is only for a case where the electric gear is at low speed.

TABLE 1

| | Mechanical shifting | | | |
|---|---|---|---|---|
| | Spindle at high speed | | Spindle at low speed | |
| | Electric gear | | | |
| | Motor at high speed | Motor at low speed | Motor at high speed | Motor at low speed |
| Work torque (N · m) | 5 | 15 | 30 | 65 |
| Lock torque (N · m) | — | 35 | — | 130 |

On a top surface of the tubular portion 61 of the handle housing 8, a display lamp 83, which lights in operation of the electric gear, is disposed to allow a worker to easily visually perceive whether the electric gear operates or not.

The number of rotations of the spindle at the mechanical shifting, the number of rotations of the brushless motor at the electric gear, and the threshold value of the motor current are not limited the above-described examples, and can be changed as necessary. The load index of the electric gear is not limited to the motor current, and, for example, the number of rotations of the motor, battery current, and battery voltage may be considered. Thus, the load index of the electric gear can be replaced by any one of them, and a plurality of ones among them can be employed as the index. It is also considered that a predetermined width is provided to the set threshold value, and the current conduction angle is switched, for example, when a period during which the motor current is at the threshold value within the predetermined width reaches a predetermined period.

Further, for the current conduction angle, another numerical value such as 130° and 180° is selectable other than 120° and 150°, and three or more numerical values may be set to be selected in accordance with the respective corresponding threshold values.

Furthermore, an advance angle corresponding to the current conduction angle may be set in advance, and the current-conduction-angle determining unit may determine the corresponding advance angle together when selecting the current conduction angle.

Then, such combination use of the mechanical shifting and the electric gear can be employed at other electric power tools such as a driver drill, a vibration driver drill, a screw driver, and a circular saw, not limited to the angle drill. The mechanical shifting is not limited to the manual switching, and can employ automatic switching similarly to the electric gear. Conversely, the electric gear can employ the manual switching similarly to the mechanical shifting. However, even in the case of the manual switching of the electric gear, it is possible to employ semi-automatic switching such that the electric gear automatically switches to low speed when the load increases while using the high speed, and the electric gear automatically returns to high speed when the load decreases (an inverse case is also possible).

The battery mounting portion 9 is formed so as to open rearward. Inside (at a bottom portion side of) the battery mounting portion 9, upper and lower two terminal blocks 78, 78 are disposed in a lateral posture in parallel. Each of the terminal blocks 78, 78 include terminal plates 79, 79. At upper and lower portions of each terminal block 78, a pair of rail portions 80, 80 on which the battery pack 10 can laterally slide in a lateral posture from a left side to be mounted are each formed. The battery pack 10 uses a lithium-ion battery whose output voltage is 18 V. In a state of being mounted on the battery mounting portion 9, the battery pack 10 is secured to a position where a left end of a mounting portion disposed on a front surface of each battery pack 10 abuts on a left end of the rail portion 80, so that the battery pack 10 is electrically coupled. In this state, the battery pack 10 is configured not to project outside from a right side surface of the battery mounting portion 9. A hook 81 is a suspending hook screwed on the right side surface of the battery mounting portion 9.

At the angle drill 1 configured as described above, when the trigger 71 is pushed to turn ON the switch 70, the power is fed to the brushless motor 3 and the rotation shaft 20 rotates. That is, the control circuit board 75 of the controller 74 obtains a rotation detection signal indicating a position of the permanent magnet 22 of the rotor 12 which is output from the rotation detecting element 18 of the sensor circuit board 17, and obtains a rotating state of the rotor 12. Then, the control circuit board 75 of the controller 74 controls ON/OFF of each switching element corresponding to the obtained rotating state so as to flow current with respect to each coil 16 of the stator 11 in order. Thus, the rotor 12 rotates with the rotation shaft 20.

When the rotation shaft 20 rotates, the rotation decelerated via the deceleration mechanism 5 is transmitted to the output shaft 43, and then, the spindle 6 deceleratingly rotates via the bevel gears 44, 54, thus integrally rotating the drill chuck 7. Accordingly, a drilling work and similar work by a bit mounted on the drill chuck 7 is enabled.

A whole gravity center position G in a state where the battery packs 10, 10 are mounted, as illustrated in FIG. 6, is at a slightly rearward position at an axial center of the motor housing 2, thus making a balance in the front-rear direction. Accordingly, the operability is excellent when the worker grips the front grip 55 by one hand and grips the grip portion 62 of the handle housing 8 by another hand.

In this embodiment, the hook 81 is mounted on the right side surface of the battery mounting portion 9. When the angle drill 1 is used in a state where the hook 81 has been removed, if the work is performed such that the right side surface, from which the battery pack 10 does not project, is pressed to a wall or similar thing, the angle drill 1 can be stably held even if a reaction torque occurs.

As illustrated in FIGS. 2 and 6, in a side view and its cross-sectional view of the angle drill 1, a lower surface of the handle housing 8 is positioned below lower surfaces of the motor housing 2 and the rear tube portion 32 of the gear housing 4. Accordingly, the possibility of breakage, which may occur due to contact of the speed switching lever 48 with the ground or similar surface, is reduced.

On the other hand, when the rotation shaft 20 rotates and the centrifugal fan 26 integrally rotates, air is sucked into the air intake opening 77 disposed on the lower surface of the handle housing 8 and reaches the motor housing 2 from the controller housing portion 63 through the tubular portion 61. Then, after passing the brushless motor 3, the air is discharged from the exhaust outlet 27. By a flow of the air, the controller 74 is cooled in the controller housing portion 63, and the brushless motor 3 is cooled in the motor housing 2.

The angle drill 1 in the above-described embodiment includes the loop-shaped handle housing 8 disposed at the rear of the motor housing 2 and the battery mounting portion 9 configured to hold the two battery packs 10, 10 at the rear portion of the handle housing 8. Thus, the gear housing 4 and the battery packs 10, 10, which are heavy in weight, are disposed back and forth so as to be excellent in balance, and stably gripping is obtained by the loop-shaped handle housing 8. Accordingly, even if the weight is heavy, the operability is excellent.

Especially, the whole gravity center position G is positioned inside the motor housing 2 in the state where the battery packs 10, 10 are held onto the battery mounting portion 9, thus achieving an appropriate gravity center balance.

However, the gravity center position G is not limited to inside the motor housing 2, and depending on the front and rear weights, may be inside the tubular portion 61 in the handle housing 8 (ahead of a loop-shaped part at the handle housing 8).

The handle housing 8 has a structure including the battery mounting portion 9, which extends in the vertical direction to be configured to hold the battery packs 10, 10, the grip portion 62, which extends in the front-rear direction and at which the switch 70 is disposed, and the controller housing portion 63, which extends in the front-rear direction below the grip portion 62 and at which the controller 74 is disposed. In the handle housing 8, cooling air passes through a position different from the grip portion 62. Therefore, the controller 74 and the brushless motor 3 are efficiently cooled.

Furthermore, the two battery packs 10, 10 are mounted in a lateral posture in the vertical direction. Therefore, the structure is made compact even if the two battery packs 10, 10 are mounted. Especially, the sum of the output voltages of the battery packs 10, 10 is 36 V, therefore, continuous use with high output power is enabled.

In addition, the grid-like reinforcing rib 65 is disposed upright on the inner surface of the handle housing 8, therefore, strength of the handle housing 8 is secured even if the handle housing 8 is made of the resin.

Figure 10:
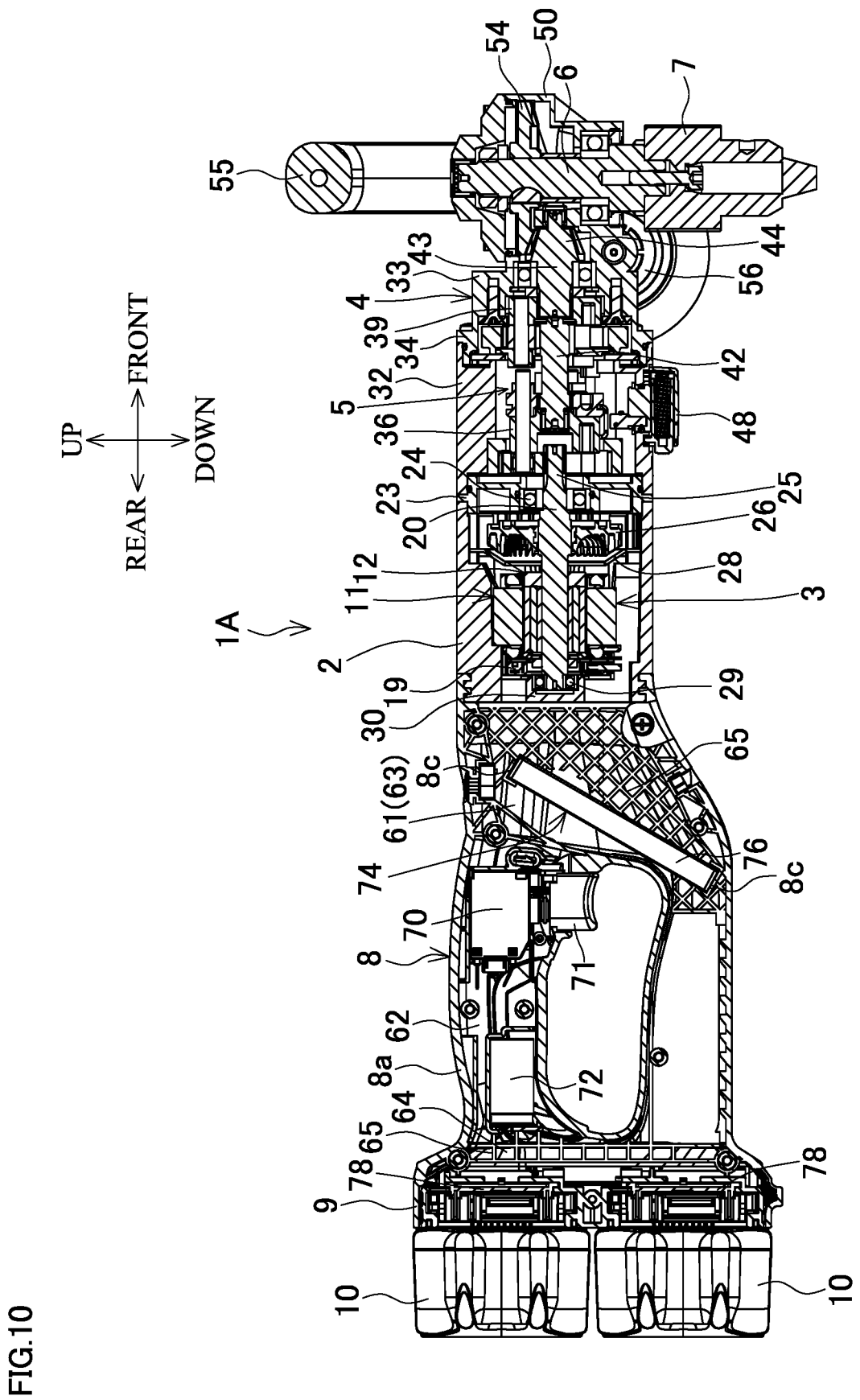
FIG. 10 is a cross-sectional view taken along the line A-A in FIG. 5 that illustrates a modification example of placement of a controller.

In the above-described embodiment, a controller housing portion is formed at a lower side of a loop-shaped handle housing. However, the configuration is not limited to this. As an angle drill 1A illustrated in FIG. 10, the controller 74 may be housed in the tubular portion 61 in an inclined posture such that that the front side is higher than the rear side, so as to dispose the controller 74 ahead of the grip portion 62 using the tubular portion 61 as the controller housing portion 63. In this case, a housing portion of the chuck key 66 can be disposed at a lower side of the handle housing 8, which is empty by moving of the controller 74. The air intake opening 77 may be disposed on side surfaces and a lower surface of the tubular portion 61.

Figure 11:
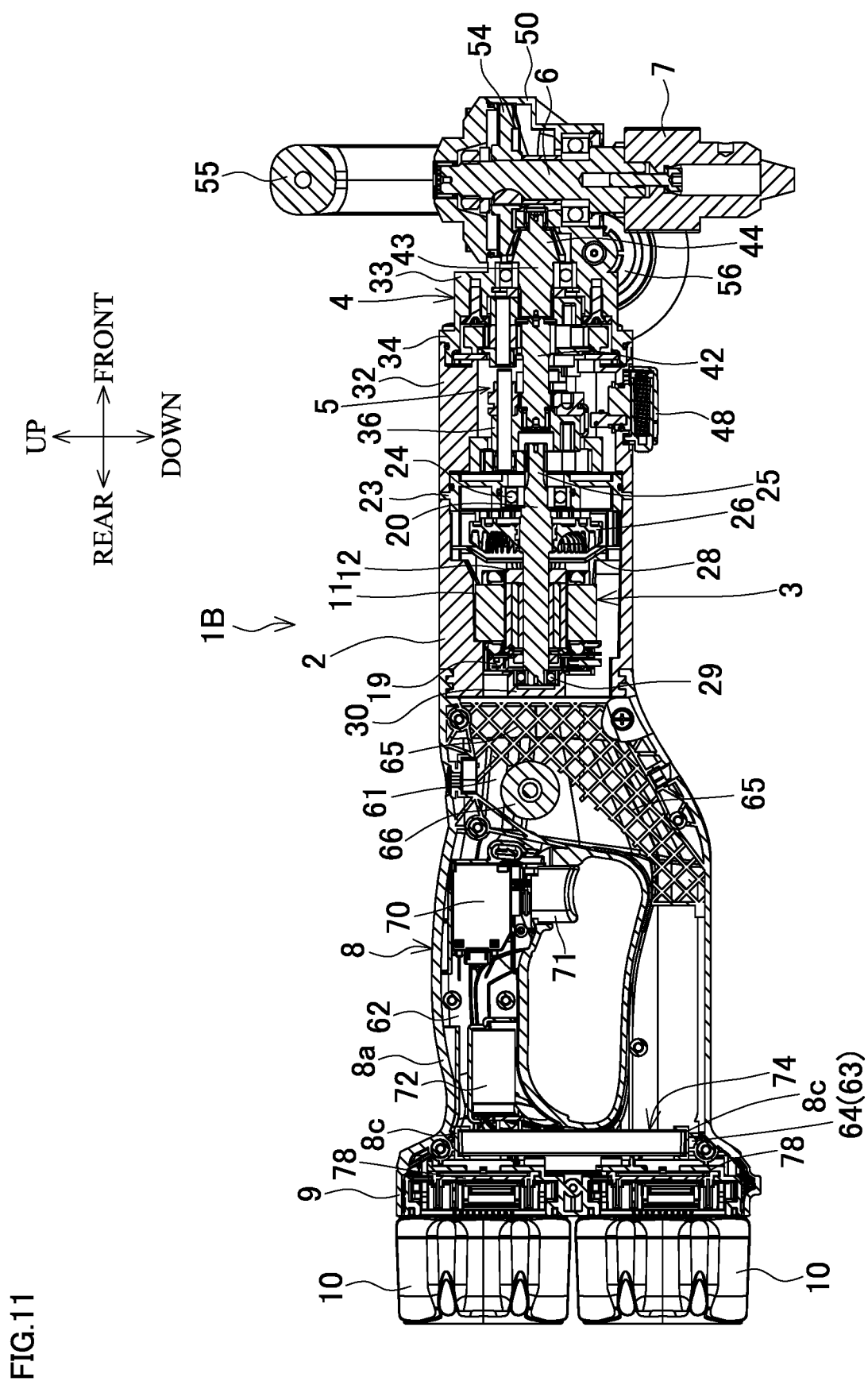
FIG. 11 is a cross-sectional view taken along the line A-A in FIG. 5 that illustrates a modification example of placement of the controller.

As an angle drill 1B illustrated in FIG. 11, the controller 74 may be housed in the rear end portion 64 as extending in the vertical direction, so as to dispose the controller 74 at a rear side of the grip portion 62 using the rear end portion 64 as the controller housing portion 63. In this case, the controller 74 also can be integrally disposed with the terminal blocks 78, 78. The air intake opening 77 may be disposed on side surfaces of the rear end portion 64. If the air intake opening 77 is positioned between the controller 74 and the terminal block 78, the terminal block 78 is also cooled. If it is not necessary to cool the terminal block 78, the air intake opening 77 may be positioned at right and left outsides of the controller 74.

Besides, a battery pack whose output voltage is other than 18 V may be used, and one battery pack whose output voltage is 36 V may be used. When the one battery pack whose output voltage is 36 V is used, if the battery pack is mounted so as to be vertically long in the mounted state, a battery mounting portion also vertically elongates. Therefore, the load can be preferably received.

Furthermore, the rechargeable electric power tool is not limited to the angle drill, and another type such as a grinder has no difficulty. Depending on the type of the rechargeable electric power tool, the battery pack may be slid to be mounted from the right side or from the top side.

On the other hand, for a case of a controller, it is preferred that its opening is upward in the embodiment in FIG. 6. In such a manner, the airflow does not pass through a potting part of a control circuit board, so as to reduce a possibility of damaging an electric power lead wire that supplies electric power from a battery pack to the controller, a power lead wire that supplies electric power to a brushless motor, and a signal-transmission lead wire that transmits a rotation detection signal from a sensor circuit board. Since the airflow contacts a lower surface of the case, effective cooling is ensured. If the opening is obliquely rearward in FIG. 10 and frontward in FIG. 11, similar advantage can be obtained.

Furthermore, the case of the controller is preferred to be made of metal. When the case is made of metal, cooling effect increases, and the controller housing portion is reinforced from inside. Therefore, rigidity increases, which leads to the increased strength of a handle housing.

The controller may have a structure such that the control circuit board is housed in the case integrally disposed with a switch at a grip portion side and is potted. In this case, when a switching element is disposed at the control circuit board, the airflow does not pass through the grip portion. Thus, a heat sink coupled to the switching element may be extended to a flow path of the airflow inside a tubular portion, or may be extended to a flow path of the airflow as going around from, for example, a rear side to an opposite side of the grip, in order to radiate heat.

Furthermore, the switching element may be mounted on the sensor circuit board, so that the airflow is allowed to directly cool the switching element, and therefore, heat generation of the switching element is preferably reduced.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:
1. A rechargeable electric power tool comprising:
a brushless motor that includes a rotation shaft oriented in a front-rear direction;
a motor housing that houses the brushless motor;
a gear housing disposed on a front side of the brushless motor;
a final output shaft that (1) is supported by the gear housing and (2) extends in a direction transverse to the front-rear direction;
a controller configured to control the brushless motor; and
a loop-shaped handle housing disposed at a rear side of the motor housing, wherein:
the handle housing includes:
a battery mounting portion that extends in the direction transverse to the front-rear direction and is configured to hold a battery pack;

a grip portion that extends in the front-rear direction, a switch being disposed at the grip portion; and a controller housing portion that (1) extends in the front-rear direction and (2) is spaced from the grip portion in the direction transverse to the front-rear direction, and the controller is positioned in the controller housing portion and extends in the front-rear direction such that a largest dimension of the controller is in the front-rear direction.

2. The rechargeable electric power tool according to claim 1, wherein
airflow generated by rotation of a fan disposed at the rotation shaft passes through the controller housing portion to cool the controller.

3. The rechargeable electric power tool according to claim 2, wherein
an air intake opening for generating the airflow is formed on a lower surface of the controller housing portion.

4. The rechargeable electric power tool according to claim 3, wherein:
the handle housing includes a tubular portion disposed at a front side of the grip portion and the controller housing portion; and
the airflow passes through the tubular housing portion.

5. The rechargeable electric power tool according to claim 4, wherein
the airflow passes through the controller housing portion to cool the controller.

6. The rechargeable electric power tool according to claim 3, wherein the controller is located between the air intake opening and the fan.

7. The rechargeable electric power tool according to claim 1, wherein:
an LED is in the controller housing portion, at a front side of the controller.

8. The rechargeable electric power tool according to claim 1 further comprising:
a speed switching lever disposed at a lower portion of the gear housing.

9. The rechargeable electric power tool according to claim 1, wherein the center of gravity of the power tool when the battery pack is attached to the battery mounting portion is between a front side of the loop-shaped handle housing and the motor housing.

10. The rechargeable electric power tool according to claim 1, further comprising a capacitor located between the switch and the controller.

* * * * *